United States Patent
Dang et al.

(10) Patent No.: US 10,503,971 B1
(45) Date of Patent: *Dec. 10, 2019

(54) PLATFORM FOR DOCUMENT CLASSIFICATION

(71) Applicant: Capital One Services, LLC, McLean, VA (US)

(72) Inventors: Steven Dang, Plano, TX (US); Jason Gould, San Jose, CA (US); Jennifer Jiang, Plano, TX (US); Christopher Akatsuka, Frisco, TX (US); Douglas Slattery, McKinney, TX (US); Vijaya Pasam, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,287

(22) Filed: Aug. 14, 2019

Related U.S. Application Data

(63) Continuation of application No. 16/358,046, filed on Mar. 19, 2019, now Pat. No. 10,402,641.

(51) Int. Cl.
  *G06K 9/00*  (2006.01)
  *G06F 16/93*  (2019.01)
  *G06K 9/62*  (2006.01)
  *G06N 20/00*  (2019.01)
  *G06F 17/18*  (2006.01)

(52) U.S. Cl.
  CPC ......... *G06K 9/00456* (2013.01); *G06F 16/93* (2019.01); *G06F 17/18* (2013.01); *G06K 9/628* (2013.01); *G06N 20/00* (2019.01)

(58) Field of Classification Search
  CPC .... G06K 9/00456; G06K 9/628; G06F 16/93; G06F 17/18; G06N 20/00
  See application file for complete search history.

(56) References Cited

U.S. PATENT DOCUMENTS

| | | |
|---|---|---|
| 5,991,709 A | 11/1999 | Schoen |
| 6,944,340 B1 | 9/2005 | Shah |
| 8,019,629 B1 | 9/2011 | Medina, III et al. |
| 8,438,163 B1 | 5/2013 | Li et al. |

(Continued)

FOREIGN PATENT DOCUMENTS

RU   2652461 C1   4/2018

OTHER PUBLICATIONS

Co-pending U.S. Appl. No. 16/358,046, filed Mar. 19, 2019.

(Continued)

*Primary Examiner* — Mia M Thomas
(74) *Attorney, Agent, or Firm* — Harrity & Harrity, LLP

(57) ABSTRACT

A device obtains image data associated with a document. Using a first machine learning model, the device determines, for the document, a first classification of one of a plurality of document types and a first confidence score associated with the first classification, and a second classification of one of the plurality of document types and a second confidence score associated with the second classification based on the image data. The device determines a difference between the first confidence score and the second confidence score, compares the difference and a threshold value, and accept the first classification of the document when the difference satisfies the threshold value.

20 Claims, 9 Drawing Sheets

(56) References Cited

U.S. PATENT DOCUMENTS

| | | | |
|---|---|---|---|
| 8,463,790 B1 | 6/2013 | Joshi et al. | |
| 8,712,143 B2 | 4/2014 | Tran | |
| 8,755,779 B1 | 6/2014 | Burks et al. | |
| 8,897,563 B1 | 11/2014 | Welling et al. | |
| 9,471,852 B1 | 10/2016 | Feris et al. | |
| 10,275,523 B1* | 4/2019 | Wolkerstorfer | G06K 9/3208 |
| 10,291,610 B2 | 5/2019 | Chang et al. | |
| 10,324,936 B2* | 6/2019 | Feuersanger | G06N 20/00 |
| 10,409,805 B1* | 9/2019 | Jain | G06N 20/00 |
| 2006/0045379 A1 | 3/2006 | Heaney, Jr. et al. | |
| 2007/0011151 A1* | 1/2007 | Hagar | G06F 16/3329 |
| 2008/0137954 A1 | 6/2008 | Tang et al. | |
| 2009/0041330 A1 | 2/2009 | Journey et al. | |
| 2009/0100269 A1 | 4/2009 | Naccache | |
| 2009/0185738 A1 | 7/2009 | Nepomniachtchi | |
| 2010/0092093 A1 | 4/2010 | Akatsuka et al. | |
| 2011/0194770 A1* | 8/2011 | Kim | G06K 9/00456 382/176 |
| 2013/0120595 A1 | 5/2013 | Roach et al. | |
| 2014/0237496 A1 | 8/2014 | Julian | |
| 2015/0078665 A1 | 3/2015 | Wang et al. | |
| 2015/0213283 A1 | 7/2015 | Ho | |
| 2015/0334562 A1 | 11/2015 | Perold et al. | |
| 2016/0248765 A1 | 8/2016 | Saxena et al. | |
| 2016/0335494 A1 | 11/2016 | Ho | |
| 2017/0180571 A1* | 6/2017 | Inomata | G06K 9/00449 |
| 2018/0060547 A1 | 3/2018 | Holz et al. | |
| 2018/0137350 A1 | 5/2018 | Such et al. | |
| 2018/0260617 A1* | 9/2018 | Jones | G06K 9/00288 |
| 2018/0373711 A1* | 12/2018 | Ghatage | G06K 9/00456 |
| 2019/0164313 A1* | 5/2019 | Ma | G06K 9/6227 |

OTHER PUBLICATIONS

Lucia Noce., "Document Image Classification Combining Textual and Visual Features," Dec. 2016, 74 pages.

Neuberg B., "Creating a Modern OCR Pipeline Using Computer Vision and Deep Learning," Apr. 12, 2017, 36 pages. Retrieved from the Internet[URL:https://blogs.dropbox.com/tech/2017/04/creating-a-modern-ocr-pipeline-using-computer-vision-and-deep-learning/].

Ozhiganov i., "Deep Dive into OCR for Receipt Recognition," Jun. 21, 2017,16 pages, Retrieved from the Internet: [URL:https://dzone.com/articles/using-ocr-for-receipt-recognition].

* cited by examiner

PLATFORM FOR DOCUMENT CLASSIFICATION

RELATED APPLICATION

This application is a continuation of U.S. patent application Ser. No. 16/358,046, filed Mar. 19, 2019, which is incorporated herein by reference in its entirety.

BACKGROUND

A financial institution may require an applicant to submit several documents when applying for a financial service, such as a loan. Such documents may be submitted electronically, for use in verifying the applicant's income, assets, and/or debts. The financial institution may hire a business specializing in the processing of electronic documents to manually classify the documents and/or extract information from the documents as part of an approval process, such as a loan approval process.

SUMMARY

According to some implementations, a method may include obtaining, by a processor, first information associated with a document, wherein the first information includes image data. The method may include determining, for the document, by the processor, and using a first machine learning model, a first classification of one of a plurality of document types and a first confidence score associated with the first classification based on the image data, wherein the first confidence score indicates a first confidence level that the document corresponds to the first classification. The method may include comparing, by the processor, the first confidence score and a first threshold value. The method may include accepting, by the processor, the first classification of the document when the first confidence score satisfies the first threshold value. The method may include obtaining, by the processor, second information associated with the document when the first confidence score fails to satisfy the first threshold value, wherein the second information includes text data. The method may include determining, for the document, by the processor, and using a second machine learning model, a second classification of one of the plurality of document types and a second confidence score associated with the second classification based on the text data, wherein the second confidence score indicates a second confidence level that the document corresponds to the second classification. The method may include comparing, by the processor, the second confidence score and a second threshold value. The method may include accepting, by the processor, the second classification of the document when the second confidence score satisfies the second threshold value.

According to some implementations, a device may include one or more memories, and one or more processors, communicatively coupled to the one or more memories, to obtain image data associated with a document. The one or more processors may determine, for the document and using a first machine learning model, a first classification of one of a plurality of document types and a first confidence score associated with the first classification, and a second classification of one of the plurality of document types and a second confidence score associated with the second classification based on the image data, wherein the first confidence score indicates a first confidence level that the document corresponds to the first classification, and the second confidence score indicates a second confidence level that the document corresponds to the second classification, wherein the first confidence score is greater than the second confidence score. The one or more processors may determine a difference between the first confidence score and the second confidence score. The one or more processors may compare the difference and a threshold value. The one or more processors may accept the first classification of the document when the difference satisfies the threshold value.

According to some implementations, a non-transitory computer-readable medium may store instructions that include one or more instructions that, when executed by one or more processors of a device, cause the one or more processors to receive first image data associated with a first page of a document, and receive second image data associated with a second page of the document. The one or more instructions may cause the one or more processors to determine, for the first page of the document and using a first machine learning model, a first classification of one of a plurality of document types and a first confidence score associated with the first classification based on the first image data, wherein the first confidence score indicates a first confidence level that the first page of the document corresponds to the first classification. The one or more instructions may cause the one or more processors to determine, for the second page of the document and using the first machine learning model, a second classification of one of the plurality of document types and a second confidence score associated with the second classification based on the second image data, wherein the second confidence score indicates a second confidence level that the second page of the document corresponds to the second classification. The one or more instructions may cause the one or more processors to compare the first confidence score and a first threshold value, and compare the second confidence score and a second threshold value. The one or more instructions may cause the one or more processors to accept the first classification of the first page of the document when the first confidence score satisfies the first threshold value, and accept the second classification of the second page of the document when the second confidence score satisfies the second threshold value, wherein the one of the plurality of document types associated with the second classification is different than the one of the plurality of document types associated with the first classification. The one or more instructions may cause the one or more processors to assign the first page of the document a first label corresponding to the first classification, and assign the second page of the document a second label corresponding to the second classification. The one or more instructions may cause the one or more processors to store the first label for access by a third-party device, and store the second label for access by the third-party device.

DETAILED DESCRIPTION

Figure 1A:
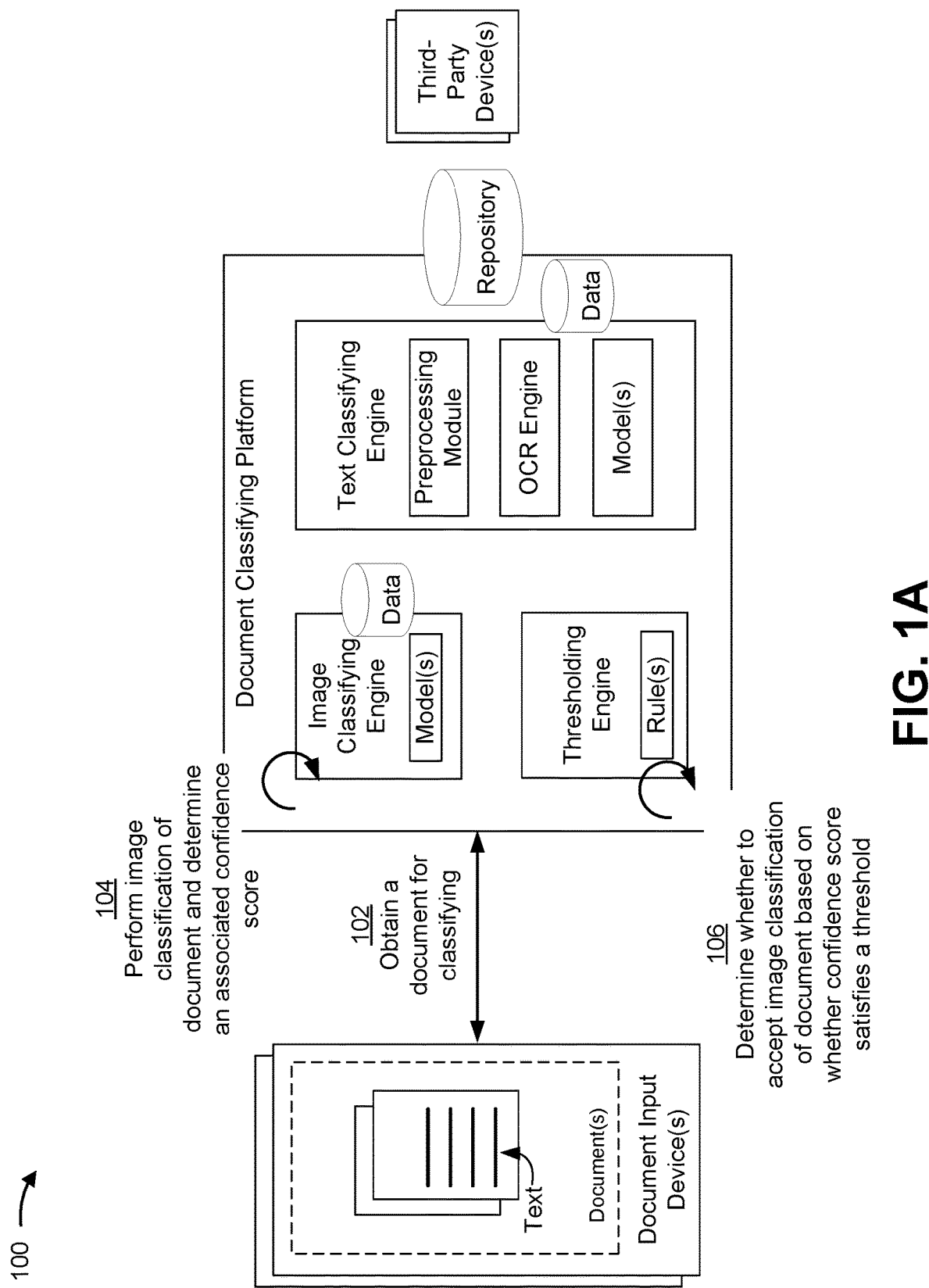
FIGS. 1A-1C are diagrams of one or more example implementations described herein.

The following detailed description of example implementations refers to the accompanying drawings. The same reference numbers in different drawings may identify the same or similar elements.

Financial institutions receive a large volume of applications from applicants seeking financial services, such as loans. These applications are often accompanied by documents (e.g., documents containing personal identifying information, documents containing tax information, documents containing legal information, documents containing banking information, etc.) that are needed to carry out the application approval process. Documents that may accompany an application for an auto loan, for example, include tax forms, such as income reporting forms (e.g., 1099 forms and W2 forms in the United States), approvals, bank statements, bookouts, buyer's orders, contracts, drivers' licenses, insurance coverages (e.g., guaranteed asset protection (GAP) insurance coverage or another type of insurance coverage), invoices, maintenance contracts, vehicle odometer readings, paystubs, personal documents (e.g., personal financial documents, personal net worth statements, and/or the like), service contracts, title information, and/or the like. Currently, the documents that accompany applications are manually classified, i.e., identified or labeled, according to their document type and any pertinent information is manually extracted from the documents for further use or processing.

However, the process of manual classification and data extraction is time consuming and inefficient, leading to increased costs and delays in application processing times. Moreover, the process of manual classification and extraction is prone to human error and subjectivity, which may cause further added costs and delays, as well as lead to legal penalties when sensitive personal or financial information is inadvertently disclosed.

In some cases, an automated image classification system may be used to identify and classify a document. Such image classification systems are known for their speed and minimal computational requirements, but also tend to have a high rate of unreliable classifications. In other cases, an automated text classification system, which analyzes text recognized through optical character recognition (OCR), may be used to identify and classify a document. Textual classification produces highly accurate classifications. However, the OCR process is slow and is computationally intensive. Thus, currently, automated classification systems must either sacrifice accuracy when using image classification or sacrifice speed and computing resources when using text classification.

Some implementations described herein include a document classifying platform that may use an image classifying engine and, selectively, a text classifying engine to quickly and accurately classify documents of an unknown document type. Documents may be initially processed through the image classifying engine and then selectively processed through the text classifying engine (e.g., if the reliability of the classification performed by the image classifying engine does not satisfy a certain threshold).

Some implementations described herein use a rigorous, computerized process to perform tasks or activities that were not previously performed. For example, previously, there did not exist a technique to classify a document by a combination of image classification and selective text classification. Accordingly, computing resources (e.g., processor resources, memory resources, and/or the like) that would otherwise be wasted by performing document classification entirely by text classification are conserved without sacrificing accuracy.

Figure 1B:
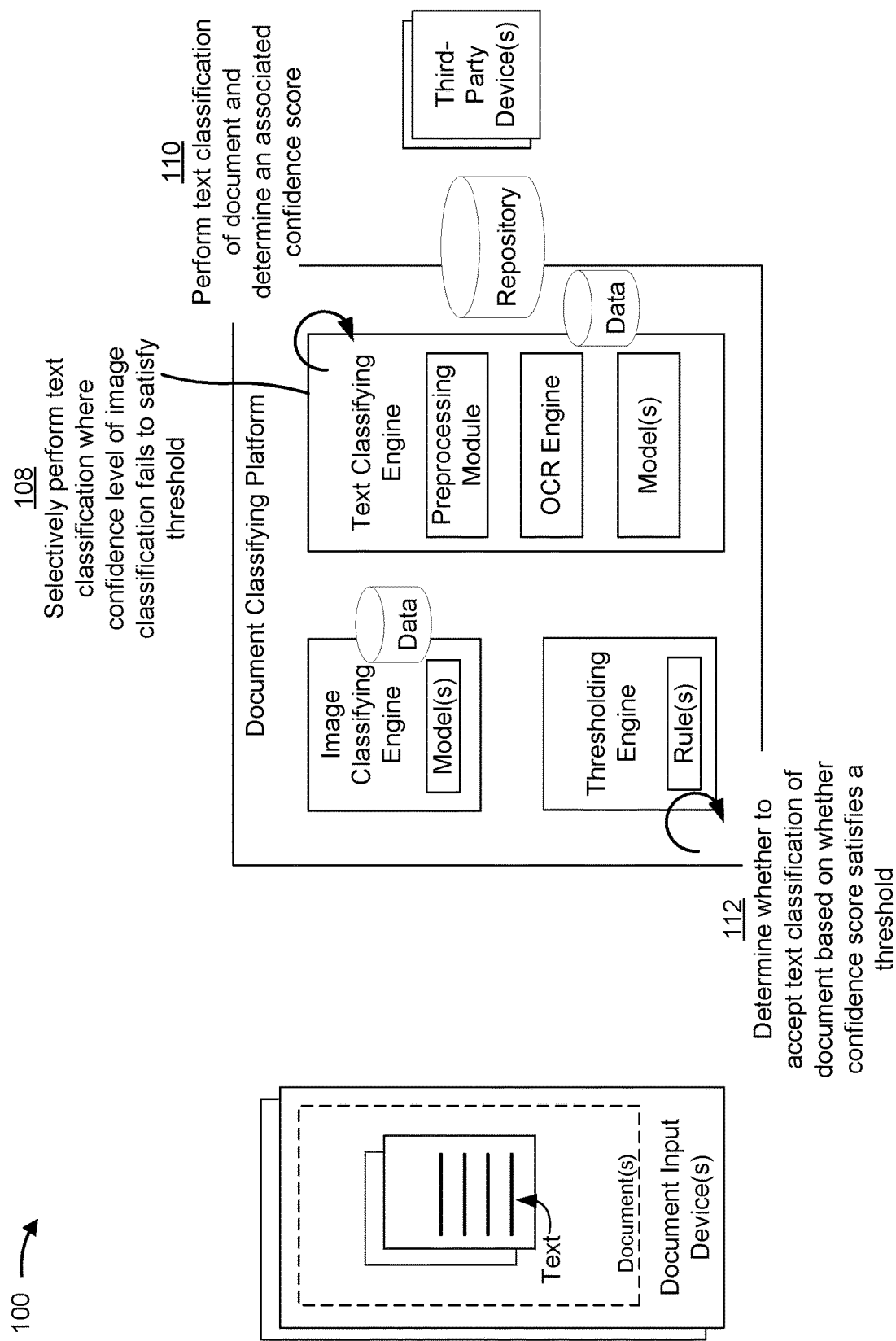
Figure 1C:
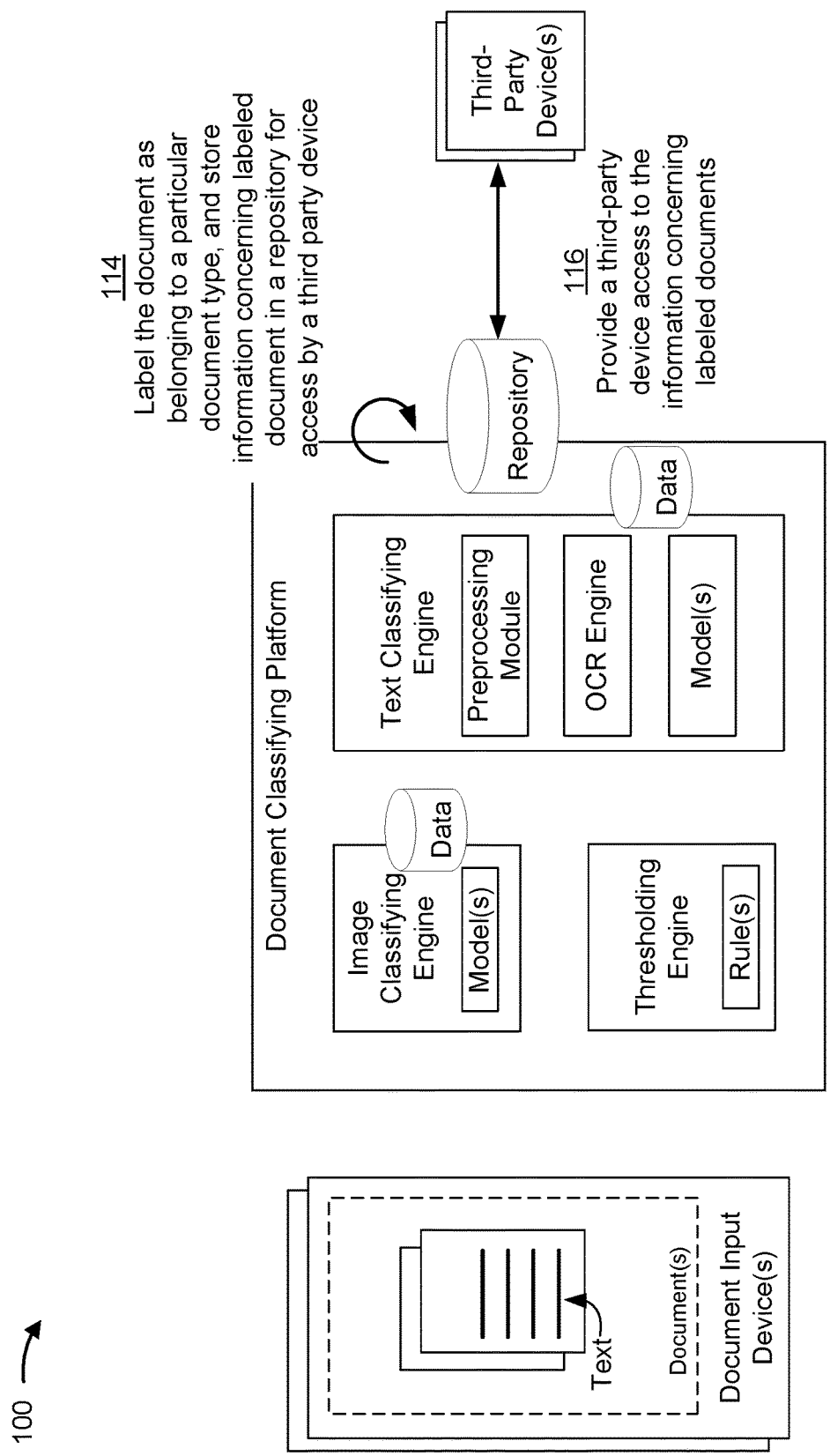

FIGS. 1A-1C are diagrams of one or more example implementations 100 described herein. As shown in FIGS. 1A-1C, example implementation(s) 100 may include a document input device, a document classifying platform, a repository, and a third-party device. The document input device may provide a document for classification to the document classifying platform. The document classifying platform may perform a document classification operation on the document. The repository may store information concerning documents on which the document classification operation has been performed by the document classifying platform. The third-party device may receive information concerning one or more documents on which the document classification operation has been performed by the document classifying platform.

As shown in FIGS. 1A-1C, the document classifying platform may include: an image classifying engine to determine a probability that a document is classified as one or more of a plurality of document types based on an image of the document; a text classifying engine to determine a probability that a document is classified as one or more of a plurality of document types based on textual content of the document; and a thresholding engine to classify the document as one of a plurality of document types based on an output of the image classifying engine and/or an output of the text classifying engine.

In some implementations, the document classifying platform may be associated with an organization, such as a financial institution, that receives a plurality of documents associated with providing services of the organization (e.g., financial services, such as loans, mortgages, etc.). A financial institution may need to classify thousands, millions, billions or more documents associated with hundreds, thousands, millions, or more financial services. While the description to follow will be described in terms of an example of a financial institution that needs to classify a plurality of documents, associated with a financial service (e.g., a loan), the description is not limited to this particular example. Implementations described herein also apply to other organizations that receive a plurality of documents in connection with other types of services.

As shown in FIG. 1A, and by reference number 102, the document classifying platform may obtain a document for classifying from the document input device. In some implementations, the document input device may be a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, and/or the like. For example, the document input device may be a computer (e.g., a server device) used by a financial institution to store documents sent by applicants in connection with applications for financial services (e.g., applications for auto loans).

Often, applicants for financial services may send (e.g., by email) an image of a document to the financial institution in an electronic format (e.g., Graphics Interchange Format (GIF), Joint Photographic Experts Group (JPEG), Portable Document Format (PDF), Tagged Image File Format (TIFF), Portable Network Graphics (PNG), and/or the like). Documents in an electronic format may be provided to, or accessible by, the document input device by File Transfer Protocol (FTP), document upload, and/or the like. In some other instances, applicants for financial services may send (e.g., by postal mail) hard copy documents (e.g., paper documents). Hard copy documents may be imaged and converted to an electronic format by a device, such as an image scanner, a digital camera, and/or the like, prior to storage by the document input device.

Documents stored by the document input device may be provided to the document classifying platform for classification upon receiving a request, to classify a document, from a user associated with the document classifying platform. For example, a user (e.g., a user associated with a financial organization) may provide a request in the form of instructions (e.g., instructions in connection with a user interface or web service, such as a Representational State Transfer (RESTful) web service, associated with the document classifying platform) to classify a document stored on the document input device. Additionally, or alternatively, a user may perform an action that triggers a request to classify a document stored by the document input device (e.g., by storing a document in a monitored document repository associated with documents in need of classification; or by transmitting a document by email, Multimedia Messaging Service (MMS), document upload, and/or the like to the document input device).

As shown by reference number 104, a document obtained by the document classifying platform in response to a request by a user is initially classified by the image classifying engine, which produces fast, but possibly inaccurate, classifications. In this way, a first attempt to classify the document is performed using minimal computing resources, which conserves computing resources of the document classifying platform that would otherwise be wasted performing classifications using more resource intensive techniques.

The image classifying engine may perform a document classification operation based on an image of the document (e.g., a PDF, a JPEG, etc.) and determine a confidence score that the document is classified as one or more of a plurality of document types. The confidence score may correspond to a measure of confidence that the document is properly classified as one of the plurality of document types. As an example in the financial institution context, the document classification operation, performed by the image classifying engine, may determine a confidence score that a document (e.g., an income reporting form) is classified as a paystub (e.g., 0.10), a personal financial document (e.g., 0.15), and an income reporting form (e.g., 0.85).

The image classifying engine may use one or more artificial intelligence techniques, such as machine learning, deep learning (e.g., convolutional neural networks), and/or the like to determine a confidence score that a document is classified as one or more of the plurality of document types.

Based on applying a rigorous and automated process associated with document classification, the image classifying engine enables recognition and/or identification of thousands or millions of features for thousands or millions of documents, thereby increasing an accuracy and consistency of document classification relative to requiring computing resources to be allocated for hundreds or thousands of technicians to manually perform a classification of the thousands or millions of documents.

In some implementations, the image classifying engine may determine whether a document is or can be classified as one of the plurality of document types, as described herein. For example, using one or more features associated with a document type, the image classifying engine may determine whether a document is or can be classified as one of the plurality of document types. In this case, the image classifying engine may generate an image classification model. For example, the image classifying engine may train a model using information that identifies a plurality of features associated with a plurality of documents (e.g., dimensions of the documents, a presence of a human face in the documents, layouts of the documents (e.g., a location and/or size of text sections), an arrangement of lines and edges in the documents, and/or the like) and information that identifies the plurality of document types for the plurality of documents. The image classifying engine may train the model to determine, based on features of a document of an unknown document type, a confidence score that indicates a measure of confidence that the document is classified as one of the plurality of document types.

In some implementations, the image classifying engine may perform a training operation when generating the image classification model, and/or may receive and use an image classification model that was trained as described below. For example, the image classifying engine may portion documents into a training set, a validation set, a test set, and/or the like. In some implementations, the image classifying engine may preprocess the documents, using, for example, a computer vision technique, to identify features of the documents and/or perform dimensionality reduction to reduce the features to a minimum feature set. In some implementations, the image classifying engine may train the image classification model on this minimum feature set, thereby reducing processing to train the machine learning model, and may apply a classification technique, to the minimum feature set.

In some implementations, the image classifying engine may use a classification technique, such as a logistic regression classification technique, a random forest classification technique, a gradient boosting machine learning (GBM) technique, and/or the like, to determine a categorical outcome (e.g., that a document is a particular document type, that a document is not a particular document type, and/or the like). Additionally, or alternatively, the image classifying engine may use a naïve Bayesian classifier technique. In this case, the image classifying engine may perform binary recursive partitioning to split the data of the minimum feature set into partitions and/or branches and use the partitions and/or branches to perform predictions (e.g., that a document is or is not associated with a particular document type). Based on using recursive partitioning, the image classifying engine may reduce utilization of computing resources relative to manual, linear sorting and analysis of data points, thereby enabling use of thousands, millions, or billions of data points to train a model, which may result in a more accurate model than using fewer data points.

Additionally, or alternatively, the image classifying engine may use a support vector machine (SVM) classifier technique to generate a non-linear boundary between data points in the training set. In this case, the non-linear boundary is used to classify test data (e.g., data relating features of documents) into a particular class (e.g., a class indicating that the document is a particular document type, a class indicating that the document is not a particular document type, and/or the like).

Additionally, or alternatively, the image classifying engine may use a computer vision technique to assist in classifying test data (e.g., data relating features of documents) into a particular class (e.g., a class indicating that the document is a particular document type, a class indicating that the document is not a particular document type, and/or the like). In some cases, the computer vision technique may include using an image recognition technique (e.g., an Inception framework, a ResNet framework, a Visual Geometry Group (VGG) framework, and/or the like), an object detection technique (e.g., a Single Shot Detector (SSD) framework, a You Only Look Once (YOLO) framework, and/or the like), an objection motion technique (e.g., an optical flow framework and/or the like), and/or the like.

Additionally, or alternatively, the image classifying engine may train the image classifying model using a supervised training procedure that includes receiving input to the model from a subject matter expert, which may reduce an amount of time, an amount of processing resources, and/or the like to train the image classification model relative to an unsupervised training procedure. In some implementations, the image classifying engine may use one or more other model training techniques, such as a neural network technique, a latent semantic indexing technique, and/or the like. For example, the image classifying engine may perform an artificial neural network processing technique (e.g., using a two-layer feedforward neural network architecture, a three-layer feedforward neural network architecture, and/or the like) to perform pattern recognition with regard to patterns of whether features described using different semantic descriptions are associated with a particular document type or not associated with a particular document type. In this case, using the artificial neural network processing technique may improve an accuracy of a model (e.g., the image classification model) generated by the image classifying engine by being more robust to noisy, imprecise, or incomplete data, and by enabling the image classifying engine to detect patterns and/or trends undetectable to human analysts or systems using less complex techniques.

As an example, the image classifying engine may use a supervised multi-label classification technique to train the model. For example, as a first step, the image classifying engine may map features to a particular document type. In this case, the features may be characterized as associated with a particular document type or not associated with a particular document type based on characteristics of the features (e.g., whether a feature of a document is similar or associated with a feature of a document type) and an analysis of the feature (e.g., by a technician, thereby reducing processing relative to the image classifying engine being required to analyze each activity). As a second step, the image classifying engine may determine classifier chains, whereby labels of target variables may be correlated (e.g., in this example, labels may be features of documents and correlation may refer to an association to a common document type). In this case, the image classifying engine may use an output of a first label as an input for a second label (as well as one or more input features, which may be other data relating to the document types), and may determine a likelihood that a particular feature that includes a set of characteristics (some of which are associated with a particular document type and some of which are not associated with the particular document type) are associated with the particular document type based on a similarity to other features that include similar characteristics. In this way, the image classifying engine transforms classification from a multilabel-classification problem to multiple single-classification problems, thereby reducing processing utilization. As a third step, the image classifying engine may determine a Hamming Loss Metric relating to an accuracy of a label used in performing a classification by using the validation set of the data. For example, an accuracy with which a weighting applied to each feature and whether each feature is associated with a document type, results in a correct prediction of whether a document may be classified as a particular document type, thereby accounting for differing amounts to which association of any one feature influences a document being classified as a particular document type. As a fourth step, the image classifying engine may finalize the model based on labels that satisfy a threshold accuracy associated with the Hamming Loss Metric and may use the model for subsequent prediction of whether features of a document are to result in the document being classified as a particular document type.

As another example, the image classifying engine may determine, using a linear regression technique, that a threshold percentage of features, in a set of features, are not associated with a particular document type, and may determine that those features are to receive relatively low association scores. In contrast, the image classifying engine may determine that another threshold percentage of features are associated with a particular document type and may assign a relatively high association score to those features. Based on the features being associated with a particular document type or not, the image classifying engine may generate the image classification model and may use the image classification model for analyzing new features that the image classifying engine identifies.

Accordingly, the image classifying engine may use any number of artificial intelligence techniques, machine learning techniques, deep learning techniques, and/or the like to classify a document as belonging to a particular document type, and determine a confidence score associated with the classification.

In some implementations, the image classifying engine may output the classification of the document as one of the plurality of document types, and the associated confidence score. In some implementations, the document classifying platform may perform additional operations to assess the accuracy of the classification made by the image classifying engine, as discussed below.

As shown by reference number 106, the thresholding engine may determine whether to accept the classification of the document by the image classifying engine based on the confidence score associated with the classification. In some implementations, the thresholding engine may apply a set of rules to the classification of the image classifying engine. For example, the set of rules may prescribe that a confidence score associated with the classification determined by the image classifying engine satisfies a certain threshold value in order for the thresholding engine to accept the classification of the document. In some implementations, the threshold value may represent a minimum confidence score that produces a reliable document classification. In this way, the thresholding engine improves document classifications by reducing inaccurate document classifications and disregarding document classifications made by the image classifying engine that fail to satisfy a certain threshold value.

In some implementations, threshold values used by the thresholding engine for each of the plurality of document types may be determined by an administrator of the document classifying platform.

In some implementations, the thresholding engine may use one or more artificial intelligence techniques, such as machine learning, deep learning, and/or the like, to determine threshold values for each of the plurality of document types. For example, the thresholding engine may train a machine learning model, and/or receive and use a model that was trained according to the description below, based on one or more parameters that include documents and their associated classifications and confidence scores. The thresholding engine may train the machine learning model, according to the one or more parameters, using historical data associated with confidence scores for document classifications that were accurate. Using the historical data and the one or more parameters as inputs to the machine learning model, the thresholding engine may determine threshold values for each of the plurality of document types that may be used to determine whether to accept a classification made by the image classifying engine.

As shown in FIG. 1B, and by reference number 108, a document that cannot be reliably classified by the image classifying engine (e.g., the confidence score associated with the classification does not satisfy the threshold value) may be classified by a text classifying engine. In this way, text classification, which possibly uses more computing resources than image classification, is performed selectively (e.g., when the image classification is unreliable), thereby conserving computing resources that would otherwise be wasted by performing document classification always using text classification.

As shown by reference number 110, the text classifying engine may perform a document classification operation based on the textual content of the document and determine a confidence score that the document is classified as one or more of a plurality of document types, as discussed above.

In some implementations, prior to obtaining the textual content of the document, the text classifying engine may preprocess the document by a preprocessing module in a manner designed to make the textual content of the document easier to read by the text classifying engine. Preprocessing may include a variety of operations that may be performed by the preprocessing module of the text classifying engine. Preprocessing may include, for example, image contrast adjustments via contrast stretching or another contrast adjustment operation, image noise filtering or another noise reduction operation, image histogram modification, a skew correction operation, and/or the like. In some implementations, preprocessing may include cropping an image of a document. For example, in a situation where multiple documents are depicted in an image, the preprocessing module may crop the multiple documents to form multiple portions of data that can be separately processed.

In some implementations, after any preprocessing, the textual content of an image of a document (e.g., a PDF, a JPEG, etc.) may be recognized by an OCR engine associated with the text classifying engine. The OCR engine may perform OCR on the document in a variety of ways and using a variety of OCR techniques, OCR models, and/or a combination of OCR techniques and/or OCR models. For example, the OCR engine may use character recognition to target textual content one character at a time, use intelligent character recognition (ICR) to identify one character at a time, use intelligent word recognition (IWR) to identify one word at a time, and/or the like. In some implementations, the OCR engine may perform OCR by executing OCR techniques and, in some implementations, the OCR engine may perform OCR using one or more other devices to perform the OCR process.

The textual content of the document output by the OCR engine may be classified as one of the plurality of document types by a document classification operation of the text classifying engine. In some implementations, the text classifying engine may use one or more artificial intelligence techniques, such as machine learning, deep learning (e.g., convolutional neural networks), natural language processing, and/or the like to classify a document as one of the plurality of document types with an associated confidence score, in a manner similar to that discussed above regarding the image classifying engine. For example, the text classifying engine may train a model using information that identifies a plurality of textual features associated with a plurality of documents (e.g., words, phrases, clauses, and/or the like) and information that identifies the plurality of document types for the plurality of documents. The text classifying engine may train the model to determine, based on textual features of a document of an unknown document type, a confidence score that indicates a measure of confidence that the document is classified as one of the plurality of document types.

In some implementations, the text classifying engine may output a classification of the document as one of the plurality of document types, and an associated confidence score, for further processing by the document classifying platform, as described below.

As shown by reference number 112, the thresholding engine of the document classifying platform may determine whether to accept the classification of the document by the text classifying engine based on the confidence score associated with the classification, as discussed above. In some implementations, the threshold values used by the thresholding engine to determine whether a classification is acceptable, as discussed above, may be different (e.g., lower) for text classification than for image classification. In this way, classifications made by the text classifying engine, which may produce more accurate classifications than the image classifying engine, are more likely to be accepted by the thresholding engine, thereby reducing the quantity of documents that must be classified by manual review, which is inefficient and prone to human error and subjectivity.

In some implementations, the document classifying platform may classify a document (e.g., a PDF) that contains multiple images of documents (e.g., multiple pages). For example, a document (e.g., a PDF) may contain multiple pages with each page, or set of pages, corresponding to a different document type (e.g., page 1 is a driver's license, pages 2-3 are a bank statement, page 4 is an income reporting form, etc.).

In some implementations, the document classifying platform may classify a multiple-page document using a splitting technique (e.g., a splitting technique performed by software that splits a PDF document into individual pages) that forms multiple single-page documents, or by obtaining (e.g., from the document input device) multiple single-page documents from a multiple-page document that was previously split. Each of the single-page documents may then be classified by the document classifying platform individually, as described above.

For example, the document classifying platform may classify a first single-page document (e.g., a driver's license) associated with a multiple-page document as one document type, and classify a second single-page document (e.g., an income reporting form) associated with the multiple-page document as another document type, etc. In some implementations, the document classifying platform may classify multiple single-page documents as a single multiple-page document of a particular document type (e.g., where multiple single-page documents that were consecutive pages of the same multiple-page document received the same document type classification).

In this way, a multiple-page document may be classified by the document classifying platform that would otherwise need to be manually reviewed to determine whether the multiple-page document contains one or more distinct document types, thereby improving efficiency and conserving computing resources (e.g., processor resources, memory resources, and/or the like) that would otherwise be wasted performing a manual review of the multiple-page document.

As shown in FIG. 1C, and by reference number 114, the document classifying platform may assign a label (e.g., an identifying file name, a tag, a flag, a location in a directory system, an entry associating a document with a document type in a log or database, and/or the like) to documents that are classified by the document classifying platform (e.g., the thresholding engine accepted the classification of the image classifying engine and/or the text classifying engine) to identify the document as belonging to a particular document type.

The document classifying platform may store, or cause to be stored, information concerning labeled documents in a repository (e.g., an electronic data storage device, such as a server device), which may be accessed by a third-party device, such as a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, and/or the like. In some implementations, the third-party device may be associated with a user of the document classifying platform. For example, the third-party device may be associated with a bank, lender, underwriter, and/or the like that requested classification of a document by the document classifying platform.

As shown by reference number 116, the document classifying platform may provide a third-party device with access to the information concerning the labeled documents stored by the repository. For example, a lender associated with a third-party device may request classification of documents associated with an application for an auto loan, and receive access for the third-party device to obtain information concerning the classified documents from the repository. The third-party device may gain access to the repository by being properly authenticated for access to the repository by the document classifying platform.

In some implementations, the document classifying platform may not permit a third-party device access to the repository. Rather, the document classifying platform may receive a request from a third-party device for documents. The document classifying platform may attempt to properly authenticate the third-party device. When the third-party device is properly authenticated, the document classifying platform may provide the documents to the third-party device via one or more of a plurality of communication techniques (e.g., via e-mail, via file download, etc.).

The third-party device may process the documents based on their classifications. For example, the third-party device may extract information from the documents, analyze the information in the documents, process an application based on the document types of the documents, may reject or approve an application based on the document types of the documents, may communicate with a user device based on the document types of the documents, and/or the like.

As indicated above, FIGS. 1A-1C are provided merely as examples. Other examples are possible and may differ from what was described with regard to FIGS. 1A-1C.

Figure 2:
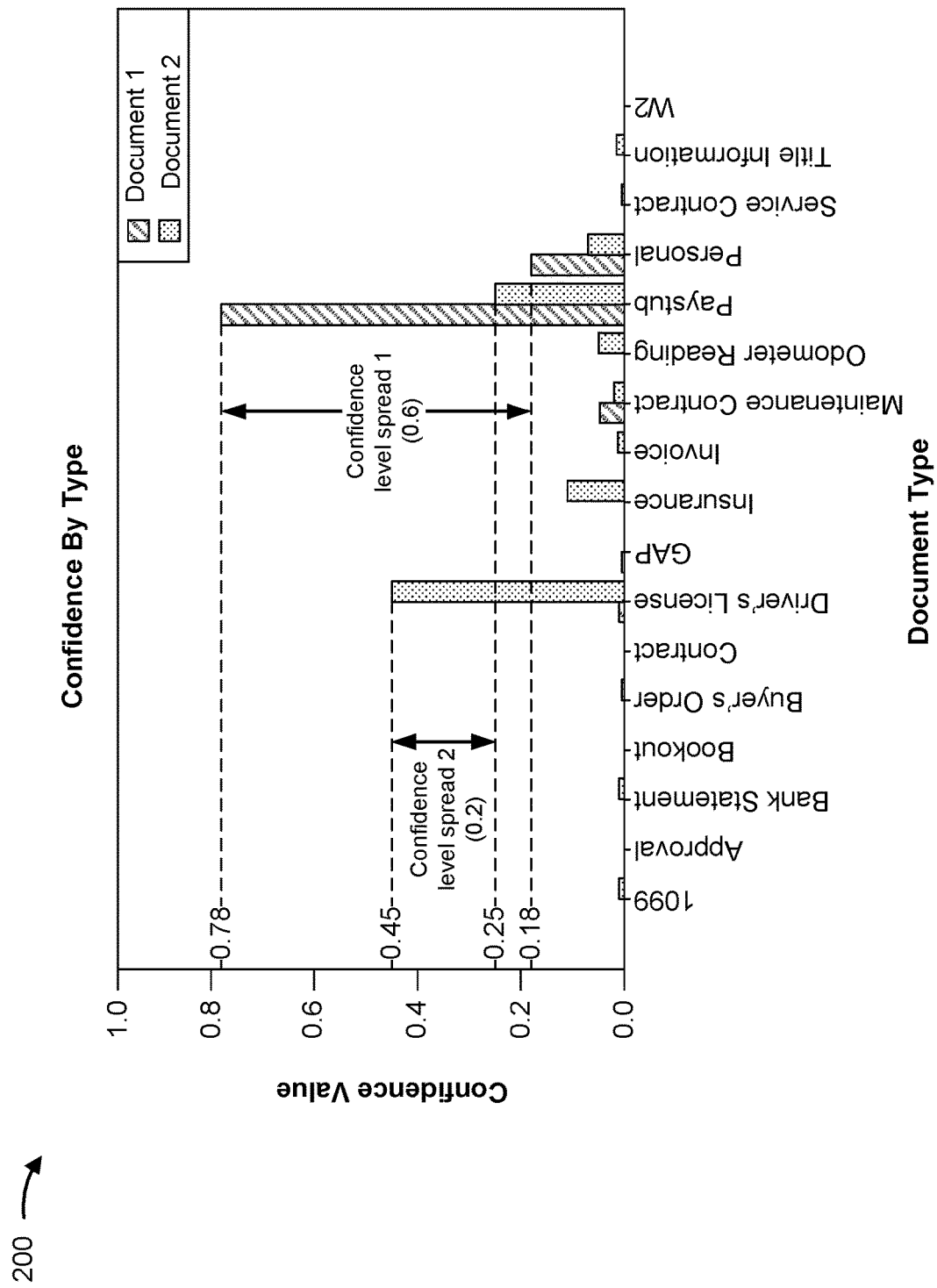
FIG. 2 is a graphical diagram depicting a method of classifying a document as described herein.

FIG. 2 is a graphical diagram, generally designated 200, depicting a method of classifying a document using a thresholding system. In some implementations, the thresholding system may be associated with a set of rules applied by the thresholding engine of the document classifying platform to determine whether to accept document classifications made by the image classifying engine and/or the text classifying engine of the document classifying platform. For example, the thresholding system may be applied by the thresholding engine when a document classification of the image classifying engine and/or text classifying engine does not have an associated confidence score that satisfies a threshold value.

According to the thresholding system, a document classification provided by the image classifying engine and/or text classifying engine may be accepted based on a confidence score spread that satisfies a threshold value. In some implementations, the thresholding system may determine the confidence score spread as a difference between a highest confidence score, associated with the document being classified as one particular document type, and a second-highest confidence score associated with the document being classified as another particular document type.

For example, as shown in FIG. 2, the confidence score spread for Document 1, one document being classified, of 0.6 is the difference between the highest confidence score associated with the document type Paystub and the second-highest confidence score associated with the document type Personal. The classification of Document 1 as a Paystub may be accepted according to the thresholding system where the associated confidence level spread (e.g., 0.6) satisfies a threshold value (e.g., 0.5). As another example shown in FIG. 2, the confidence score spread for Document 2, another document being classified, of 0.2 is the difference between the highest confidence score associated with the document type Driver's License and the second-highest confidence score associated with the document type Paystub. The classification of Document 2 as a Driver's License may be rejected according to the thresholding system where the associated confidence level spread (e.g., 0.2) does not satisfy a threshold value (e.g., 0.4).

In this way, the thresholding system provides reliable document classifications even in situations where the confidence score associated with a classification is relatively low (e.g., the confidence score does not satisfy a threshold value). Furthermore, the thresholding system may reduce the quantity of documents that cannot be classified by the document classifying platform, without retraining the image classification model and/or text classification model, thereby conserving computing resources (e.g., processing resources, memory resources, and/or the like) that would otherwise be wasted retraining the image classification model and/or text classification model.

In some implementations, one or more artificial intelligence techniques, such as machine learning, deep learning, and/or the like, may be used to determine suitable threshold values for the thresholding system for each of the plurality of document types, as discussed above for the threshold values of the thresholding engine. In some implementations, the thresholding system may apply different (e.g., lower) threshold values for a classification model that is accurate, such as a text classification model, than for a classification model with possibly less accuracy, such as an image classification model. In this way, classifications made by the text classifying engine, which may produce more accurate classifications than the image classifying engine, are more likely to be accepted by the thresholding engine according to the thresholding system, thereby reducing the quantity of documents that must be classified by manual review, which is inefficient and prone to human error and subjectivity.

As indicated above, FIG. 2 is provided merely as an example. Other examples are possible and may differ from what was described with regard to FIG. 2.

Figure 3:
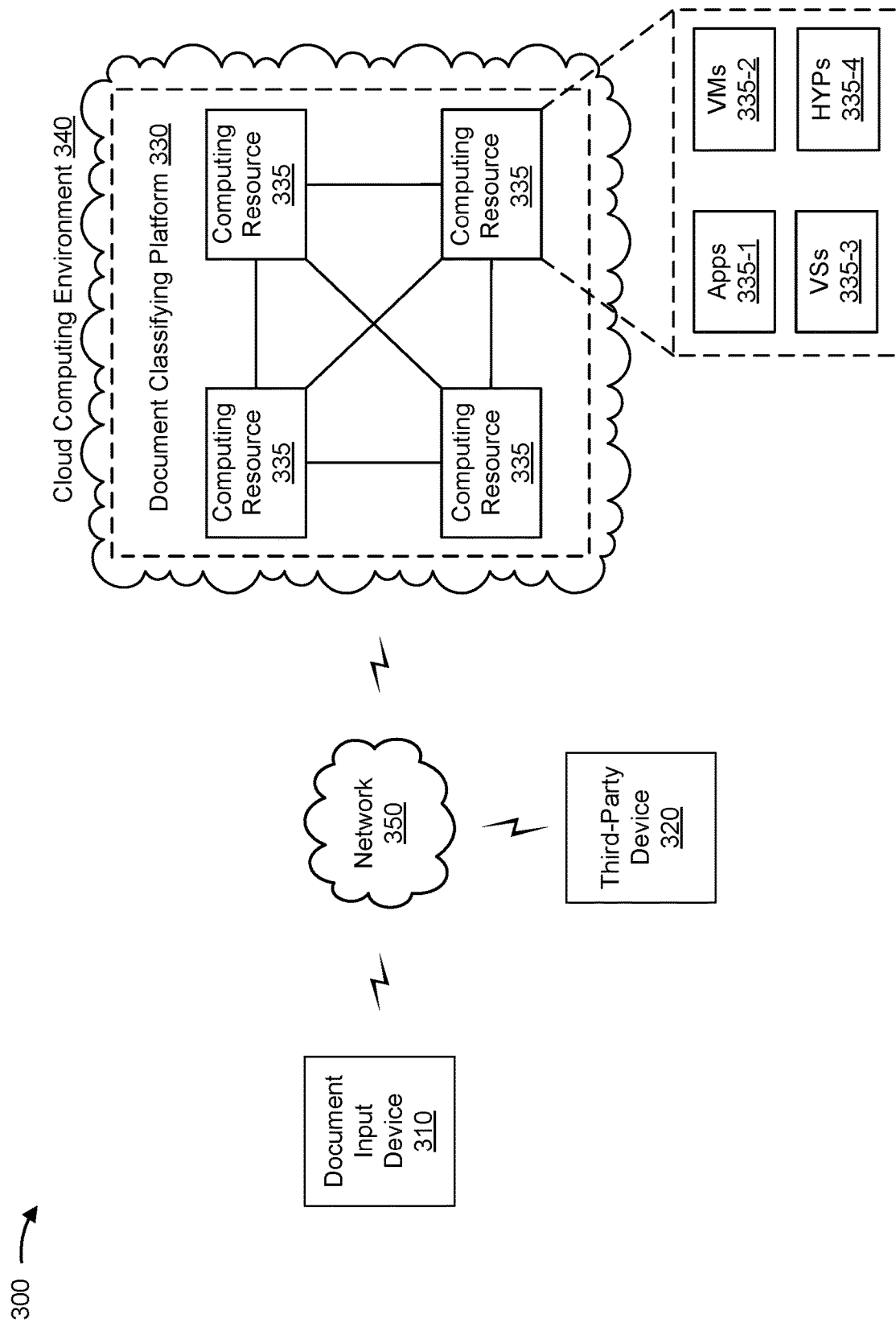
FIG. 3 is a diagram of an example environment in which the devices, systems, and/or methods, described herein, may be implemented.

FIG. 3 is a diagram of an example environment 300 in which systems and/or methods, described herein, may be implemented. As shown in FIG. 3, environment 300 may include a document input device 310, a third-party device 320, a document classifying platform 330, a computing resource 335, a cloud computing environment 340, and a network 350. Devices of environment 300 may interconnect via wired connections, wireless connections, or a combination of wired and wireless connections.

Document input device 310 includes one or more devices capable of receiving a document, converting the document to an electronic format, and/or storing the document in an electronic format for use by document classifying platform 330. For example, document input device 310 may include an electronic device, such as a scanner, a fax machine, a computer (e.g., a desktop computer, a laptop computer, a tablet computer, a handheld computer, etc.), a mobile computing device (e.g., a smart phone), a server (e.g., a host server, a document server, a data center device, etc.), and/or the like.

Third-party device 320 includes one or more devices capable of obtaining a classified document or information associated with the classified document. For example, third-party device 320 may include an electronic device, such as a computer (e.g., a desktop computer, a laptop computer, a tablet computer, a handheld computer, etc.), a mobile computing device (e.g., a smart phone), a server (e.g., a financial application server, etc.), and/or the like. In some implementations, such as in the financial institution context, third-party device 320 may be associated with a bank, a lender, a creditor, an underwriter, or another financial institution that will utilize the classified documents, such as in the course of processing a loan.

Document classifying platform 330 includes one or more computing resources assigned to classify documents. For example, document classifying platform 330 may be a platform implemented by cloud computing environment 340 that may use a combination of an image classifying engine and a text classifying engine to quickly and accurately classify documents. In some implementations, document classifying platform 330 may obtain documents in an electronic format or file, may classify the documents, and may store the documents, with labels (e.g., tags, flags, identifiers, file names, etc.), so that third-party device 320 may obtain information associated with the labeled documents when needed. In some implementations, document classifying platform 330 is implemented by computing resources 335 of cloud computing environment 340.

Document classifying platform 330 may include a server device or a group of server devices. In some implementations, document classifying platform 330 may be hosted in cloud computing environment 340. Notably, while implementations described herein describe document classifying platform 330 as being hosted in cloud computing environment 340, in some implementations, document classifying platform 330 may not be cloud-based or may be partially cloud-based.

Cloud computing environment 340 includes an environment that delivers computing as a service, whereby shared resources, services, etc. may be provided to document input device 310, third-party device 320, and/or the like. Cloud computing environment 340 may provide computation, software, data access, storage, and/or other services that do not require end-user knowledge of a physical location and configuration of a system and/or a device that delivers the services. As shown, cloud computing environment 340 may include document classifying platform 330 and computing resource 335.

Computing resource 335 includes one or more personal computers, workstation computers, server devices, or another type of computation and/or communication device. In some implementations, computing resource 335 may host document classifying platform 330. The cloud resources may include compute instances executing in computing resource 335, storage devices provided in computing resource 335, data transfer devices provided by computing resource 335, etc. In some implementations, computing resource 335 may communicate with other computing resources 335 via wired connections, wireless connections, or a combination of wired and wireless connections.

As further shown in FIG. 3, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, or the like.

Application 335-1 includes one or more software applications that may be provided to or accessed by third-party device 320. Application 335-1 may eliminate a need to install and execute the software applications on third-party device 320. For example, application 335-1 may include software associated with document classifying platform 330 and/or any other software capable of being provided via cloud computing environment 340. In some implementations, one application 335-1 may send/receive information to/from one or more other applications 335-1, via virtual machine 335-2.

Virtual machine 335-2 includes a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program and may support a single process. In some implementations, virtual machine 335-2 may execute on behalf of a user (e.g., third-party device 320), and may manage infrastructure of cloud computing environment 340, such as data management, synchronization, or long-duration data transfers.

Virtualized storage 335-3 includes one or more storage systems and/or one or more devices that use virtualization techniques within the storage systems or devices of computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 may present a virtual operating platform to the guest operating systems and may manage the execution of the guest operating systems. Multiple instances of a variety of operating systems may share virtualized hardware resources.

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
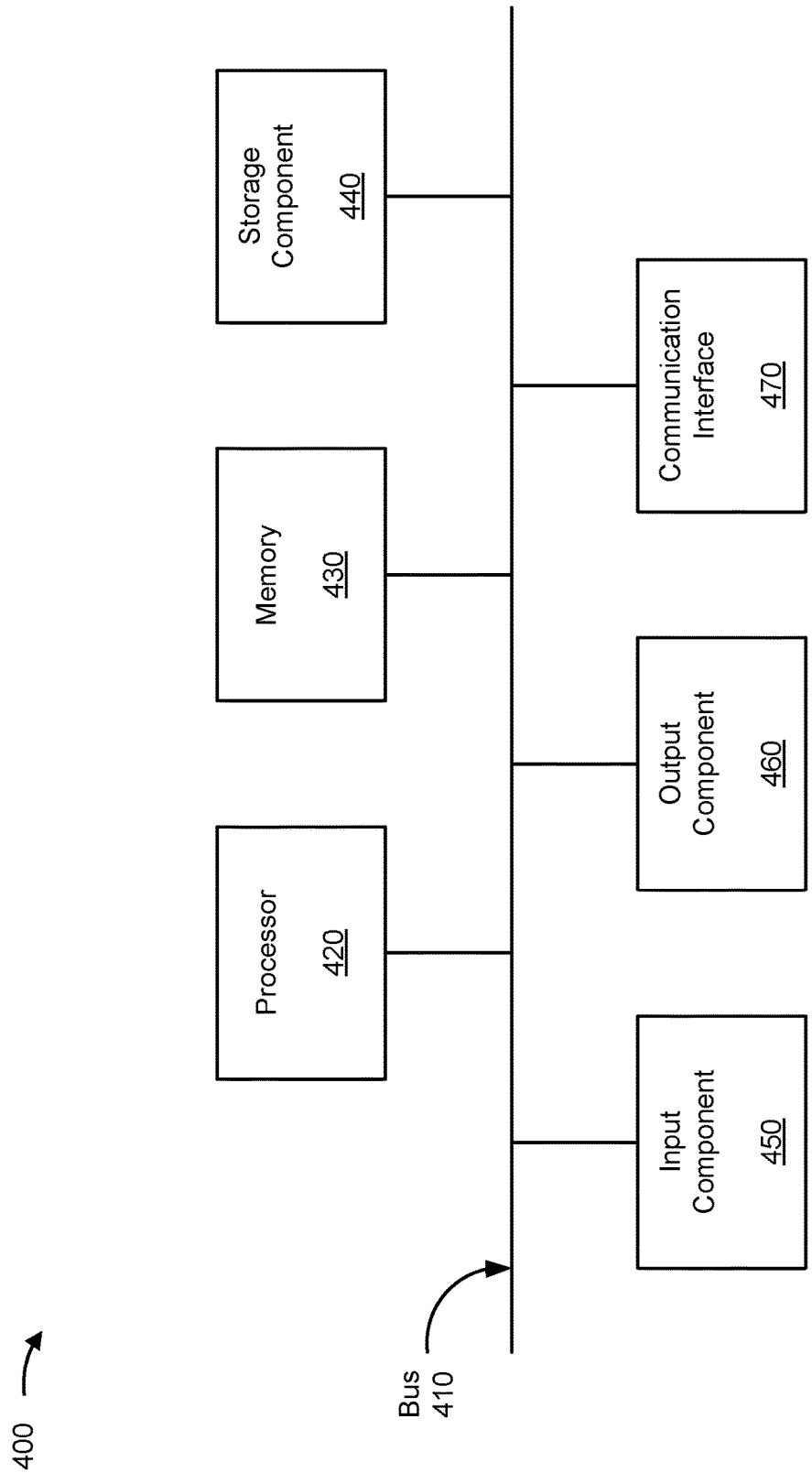
FIG. 4 is a diagram of example components of one or more devices of FIG. 3.

FIG. 4 is a diagram of example components of a device 400. Device 400 may correspond to document input device 310, third-party device 320, document classifying platform 330, and/or computing resource 335. In some implementations, document input device 310, third-party device 320, document classifying platform 330, and/or computing resource 335 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
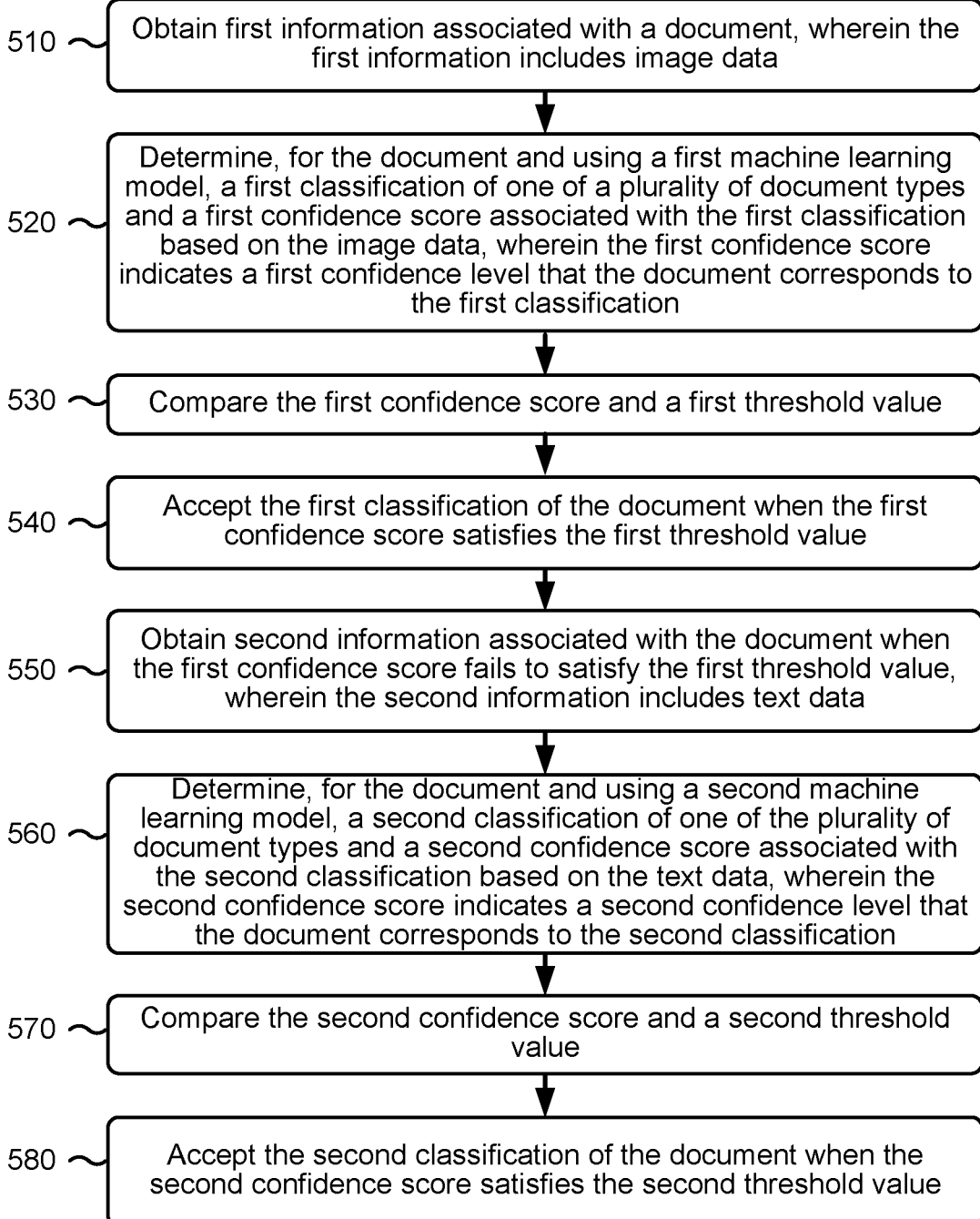
FIG. 5 is a flow chart of an example process for classifying a document.

FIG. 5 is a flow chart of an example process 500 for classifying a document. In some implementations, one or more process blocks of FIG. 5 may be performed by a document classifying platform (e.g., document classifying platform 330). In some implementations, one or more process blocks of FIG. 5 may be performed by another device or a group of devices separate from or including document classifying platform (e.g., document classifying platform 330), such as a document input device (e.g., document input device 310), a third-party device (e.g., third-party device 320), and a computing resource (e.g., computing resource 335).

As shown in FIG. 5, process 500 may include obtaining first information associated with a document, wherein the first information includes image data (block 510). For example, the document classifying platform (e.g., using computing resource 335, processor 420, memory 430, storage component 440, input component 450, communication interface 470, and/or the like) may obtain first information associated with a document, as described above. In some implementations, the first information includes image data.

As further shown in FIG. 5, process 500 may include determining, for the document and using a first machine learning model, a first classification of one of a plurality of document types and a first confidence score associated with the first classification based on the image data, wherein the first confidence score indicates a first confidence level that the document corresponds to the first classification (block 520). For example, the document classifying platform (e.g., using computing resource 335, processor 420, memory 430, storage component 440, communication interface 470, and/or the like) may determine, for the document and using a first machine learning model, a first classification of one of a plurality of document types and a first confidence score associated with the first classification based on the image data, as described above. In some implementations, the first confidence score indicates a first confidence level that the document corresponds to the first classification.

As further shown in FIG. 5, process 500 may include comparing the first confidence score and a first threshold value (block 530). For example, the document classifying platform (e.g., using computing resource 335, processor 420, memory 430, storage component 440, and/or the like) may compare the first confidence score and a first threshold value, as described above.

As further shown in FIG. 5, process 500 may include accepting the first classification of the document when the first confidence score satisfies the first threshold value (block 540). For example, the document classifying platform (e.g., using computing resource 335, processor 420, memory 430, storage component 440, and/or the like) may accept the first classification of the document when the first confidence score satisfies the first threshold value, as described above.

As further shown in FIG. 5, process 500 may include obtaining second information associated with the document when the first confidence score fails to satisfy the first threshold value, wherein the second information includes text data (block 550). For example, the document classifying platform (e.g., using computing resource 335, processor 420, memory 430, storage component 440, input component 450, communication interface 470, and/or the like) may obtain second information associated with the document when the first confidence score fails to satisfy the first threshold value, as described above. In some implementations, the second information includes text data.

As further shown in FIG. 5, process 500 may include determining, for the document and using a second machine learning model, a second classification of one of the plurality of document types and a second confidence score associated with the second classification based on the text data, wherein the second confidence score indicates a second confidence level that the document corresponds to the second classification (block 560). For example, the document classifying platform (e.g., using computing resource 335, processor 420, memory 430, storage component 440, communication interface 470, and/or the like) may determine, for the document and using a second machine learning model, a second classification of one of the plurality of document types and a second confidence score associated with the second classification based on the text data, as described above. In some implementations, the second confidence score indicates a second confidence level that the document corresponds to the second classification.

As further shown in FIG. 5, process 500 may include comparing the second confidence score and a second threshold value (block 570). For example, the document classifying platform (e.g., using computing resource 335, processor 420, memory 430, storage component 440, and/or the like) may compare the second confidence score and a second threshold value, as described above.

As further shown in FIG. 5, process 500 may include accepting the second classification of the document when the second confidence score satisfies the second threshold value (block 580). For example, the document classifying platform (e.g., using computing resource 335, processor 420, memory 430, storage component 440, and/or the like) may accept the second classification of the document when the second confidence score satisfies the second threshold value, as described above.

Process 500 may include additional implementations, such as any single implementation or any combination of implementations described below and/or in connection with one or more other processes described elsewhere herein.

In some implementations, the image data may include an image of the document. In some implementations, the document may contain a plurality of pages, the first page of the document may correspond to the first document type, a second page of the document may correspond to the second document type, and the first document type may be different than the second document type. In some implementations, one or more document types may include a document containing personal identifying information, a document containing tax information, a document containing legal information, and/or a document containing banking information.

In some implementations, the first classification may be one of a plurality of classifications, and the plurality of classifications may include a third classification for the document of one of the plurality of document types and a third confidence score associated with the third classification based on the image data, the third confidence score may indicate a third confidence level that the document corresponds to the third classification, the third confidence score may be less than the first confidence score, and the document classifying platform may determine a difference between the first confidence score and the third confidence score when the first confidence score fails to satisfy the first threshold value. Additionally, the document classifying platform may compare the difference to a third threshold value, and may accept the first classification of the document when the difference satisfies the third threshold value.

In some implementations, the third threshold value may be associated with a confidence level spread. In some implementations, the document classifying platform may assign the document a label corresponding to the one of the plurality of document types associated with the first classification, and may store the label for access by a third-party device.

In some implementations, the image data may be first image data and the label may be a first label, and the document classifying platform may obtain second image data associated with a second document, and may determine for the second document and using the first machine learning model, a third classification of one of the plurality of document types and a third confidence score associated with the third classification based on the second image data, where the third confidence score indicates a third confidence level that the second document corresponds to the third classification. Additionally, the document classifying platform may compare the third confidence score and a third threshold value, may accept the third classification of the second document when the third confidence score satisfies the third threshold value, where the one of the plurality of document types associated with the third classification is different than the one of the plurality of document types associated with the first classification, may assign the second document a second label corresponding to the one of the plurality of document types associated with the third classification, and may store the second label for access by a third-party device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
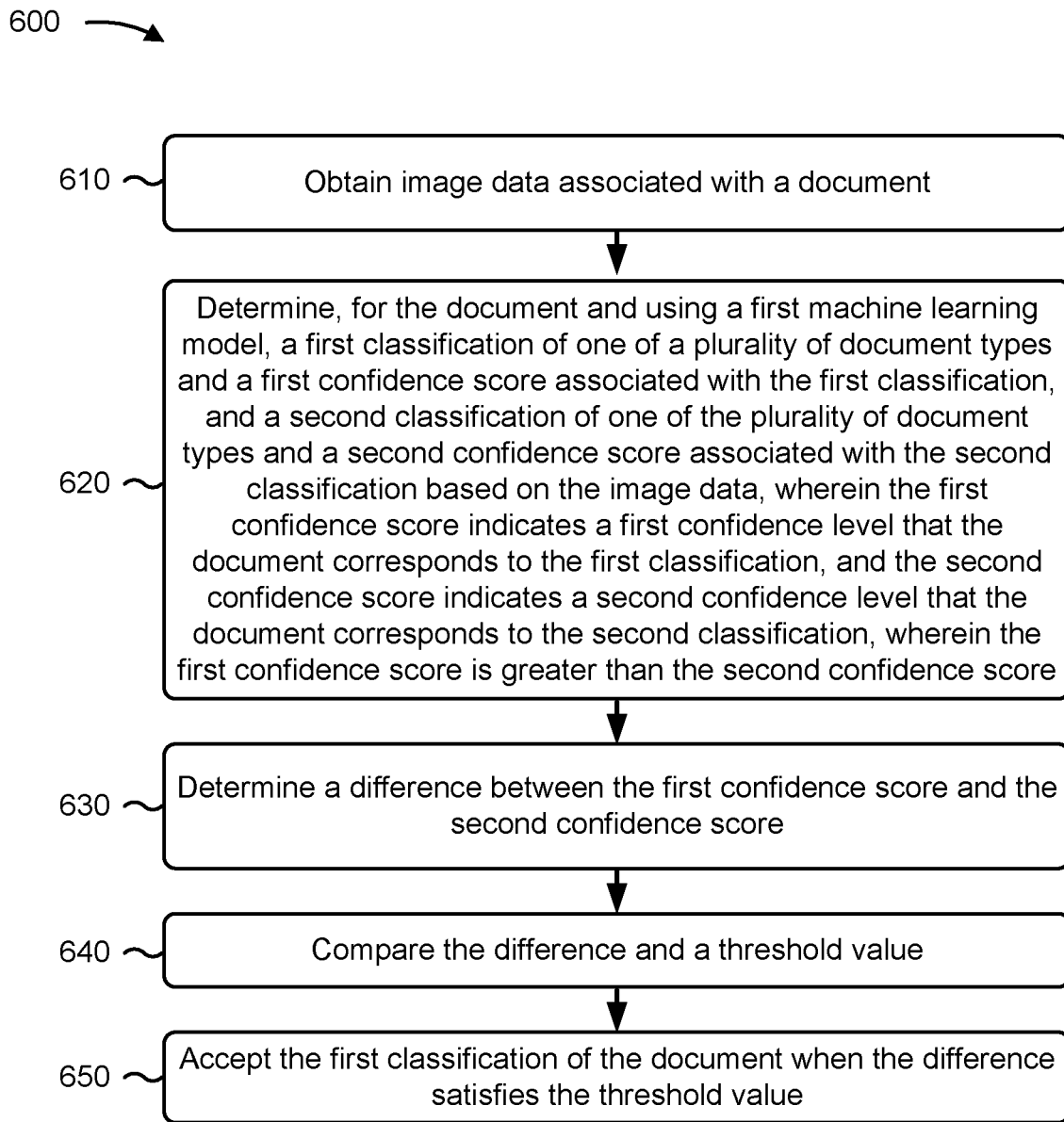
FIG. 6 is a flow chart of an example process for classifying a document.

FIG. 6 is a flow chart of an example process 600 for classifying a document. In some implementations, one or more process blocks of FIG. 6 may be performed by a document classifying platform (e.g., document classifying platform 330). In some implementations, one or more process blocks of FIG. 6 may be performed by another device or a group of devices separate from or including a document classifying platform (e.g., document classifying platform 330), such as a document input device (e.g., document input device 310), a third-party device (e.g., third-party device 320), and a computing resource (e.g., computing resource 335).

As shown in FIG. 6, process 600 may include obtaining image data associated with a document (block 610). For example, the document classifying platform (e.g., using computing resource 335, processor 420, memory 430, storage component 440, input component 450, communication interface 470, and/or the like) may obtain image data associated with a document, as described above.

As further shown in FIG. 6, process 600 may include determining, for the document and using a first machine learning model, a first classification of one of a plurality of document types and a first confidence score associated with the first classification, and a second classification of one of the plurality of document types and a second confidence score associated with the second classification based on the image data, wherein the first confidence score indicates a first confidence level that the document corresponds to the first classification, and the second confidence score indicates a second confidence level that the document corresponds to the second classification, wherein the first confidence score is greater than the second confidence score (block 620). For example, the document classifying platform (e.g., using computing resource 335, processor 420, memory 430, storage component 440, communication interface 470, and/or the like) may determine, for the document and using a first machine learning model, a first classification of one of a plurality of document types and a first confidence score associated with the first classification, and a second classification of one of the plurality of document types and a second confidence score associated with the second classification based on the image data, as described above. In some implementations, the first confidence score indicates a first confidence level that the document corresponds to the first classification, and the second confidence score indicates a second confidence level that the document corresponds to the second classification. In some implementations, the first confidence score is greater than the second confidence score.

As further shown in FIG. 6, process 600 may include determining a difference between the first confidence score and the second confidence score (block 630). For example, the document classifying platform (e.g., using computing resource 335, processor 420, memory 430, storage component 440, and/or the like) may determine a difference between the first confidence score and the second confidence score, as described above.

As further shown in FIG. 6, process 600 may include comparing the difference and a threshold value (block 640). For example, the document classifying platform (e.g., using computing resource 335, processor 420, memory 430, storage component 440, and/or the like) may compare the difference and a threshold value, as described above.

As further shown in FIG. 6, process 600 may include accepting the first classification of the document when the difference satisfies the threshold value (block 650). For example, the document classifying platform (e.g., using computing resource 335, processor 420, memory 430, storage component 440, and/or the like) may accept the first classification of the document when the difference satisfies the threshold value, as described above.

Process 600 may include additional implementations, such as any single implementation or any combination of implementations described below and/or in connection with one or more other processes described elsewhere herein.

In some implementations, the difference may be a first difference and the threshold value may be a first threshold value, and the document classifying platform may obtain text data associated with the document when the first difference fails to satisfy the first threshold value. The document classifying platform may determine, for the document and using a second machine learning model, a third classification of one of the plurality of document types and a third confidence score associated with the third classification, and a fourth classification of one of the plurality of document types and a fourth confidence score associated with the fourth classification based on the text data, where the third confidence score indicates a third confidence level that the document corresponds to the third classification, and the fourth confidence score indicates a fourth confidence level that the document corresponds to the fourth classification, where the third confidence score is greater than the fourth confidence score. Additionally, the document classifying platform may determine a second difference between the third confidence score and the fourth confidence score, compare the second difference and a second threshold value, and accept the third classification of the document when the second difference satisfies the second threshold value.

In some implementations, the image data may include an image of document. In some implementations, the plurality of document types may include a document containing personal identifying information, a document containing tax information, a document containing legal information, and/or a document containing banking information.

In some implementations, the threshold value may be associated with a confidence level spread. In some implementations, the document classifying platform may assign the document a label corresponding to the first classification, and may store the label for access by a third-party device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
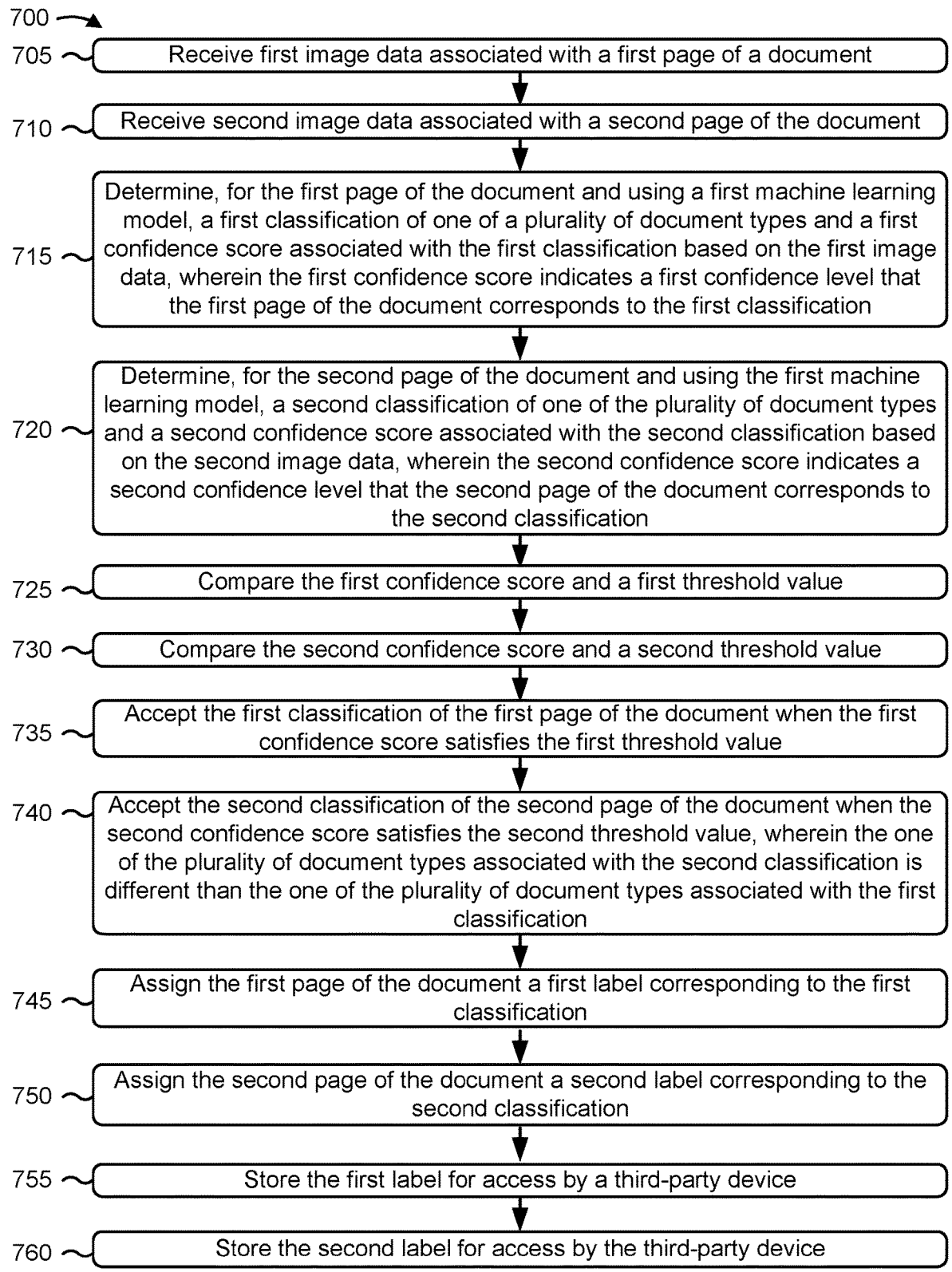
FIG. 7 is a flow chart of an example process for classifying a document.

FIG. 7 is a flow chart of an example process 700 for classifying a document. In some implementations, one or more process blocks of FIG. 7 may be performed by a document classifying platform (e.g., document classifying platform 330). In some implementations, one or more process blocks of FIG. 7 may be performed by another device or a group of devices separate from or including a document classifying platform (e.g., document classifying platform 330), such as a document input device (e.g., document input device 310), a third-party device (e.g., third-party device 320), and a computing resource (e.g., computing resource 335).

As further shown in FIG. 7, process 700 may include receiving first image data associated with a first page of a document (block 705). For example, the document classifying platform (e.g., using computing resource 335, processor 420, memory 430, storage component 440, input component 450, communication interface 470, and/or the like) may receive first image data associated with a first page of a document, as described above.

As further shown in FIG. 7, process 700 may include receiving second image data associated with a second page of the document (block 710). For example, the document classifying platform (e.g., using computing resource 335, processor 420, memory 430, storage component 440, input component 450, communication interface 470, and/or the like) may receive second image data associated with a second page of the document, as described above.

As further shown in FIG. 7, process 700 may include determining, for the first page of the document and using a first machine learning model, a first classification of one of a plurality of document types and a first confidence score associated with the first classification based on the first image data, wherein the first confidence score indicates a first confidence level that the first page of the document corresponds to the first classification (block 715). For example, the document classifying platform (e.g., using computing resource 335, processor 420, memory 430, storage component 440, communication interface 470, and/or the like) may determine, for the first page of the document and using a first machine learning model, a first classification of one of a plurality of document types and a first confidence score associated with the first classification based on the first image data, as described above. In some implementations, the first confidence score indicates a first confidence level that the first page of the document corresponds to the first classification.

As further shown in FIG. 7, process 700 may include determining, for the second page of the document and using the first machine learning model, a second classification of one of the plurality of document types and a second confidence score associated with the second classification based on the second image data, wherein the second confidence score indicates a second confidence level that the second page of the document corresponds to the second classification (block 720). For example, the document classifying platform (e.g., using computing resource 335, processor 420, memory 430, storage component 440, communication interface 470, and/or the like) may determine, for the second page of the document and using the first machine learning model, a second classification of one of the plurality of document types and a second confidence score associated with the second classification based on the second image data, as described above. In some implementations, the second confidence score indicates a second confidence level that the second page of the document corresponds to the second classification.

As further shown in FIG. 7, process 700 may include comparing the first confidence score and a first threshold value (block 725). For example, the document classifying platform (e.g., using computing resource 335, processor 420, memory 430, storage component 440, and/or the like) may compare the first confidence score and a first threshold value, as described above.

As further shown in FIG. 7, process 700 may include comparing the second confidence score and a second threshold value (block 730). For example, the document classifying platform (e.g., using computing resource 335, processor 420, memory 430, storage component 440, and/or the like) may compare the second confidence score and a second threshold value, as described above.

As further shown in FIG. 7, process 700 may include accepting the first classification of the first page of the document when the first confidence score satisfies the first threshold value (block 735). For example, the document classifying platform (e.g., using computing resource 335, processor 420, memory 430, storage component 440, and/or the like) may accept the first classification of the first page of the document when the first confidence score satisfies the first threshold value, as described above.

As further shown in FIG. 7, process 700 may include accepting the second classification of the second page of the document when the second confidence score satisfies the second threshold value, wherein the one of the plurality of document types associated with the second classification is different than the one of the plurality of document types associated with the first classification (block 740). For example, the document classifying platform (e.g., using computing resource 335, processor 420, memory 430, storage component 440, and/or the like) may accept the second classification of the second page of the document when the second confidence score satisfies the second threshold value, as described above. In some implementations, the one of the plurality of document types associated with the second classification is different than the one of the plurality of document types associated with the first classification.

As further shown in FIG. 7, process 700 may include assigning the first page of the document a first label corresponding to the first classification (block 745). For example, the document classifying platform (e.g., using computing resource 335, processor 420, memory 430, storage component 440, and/or the like) may assign the first page of the document a first label corresponding to the first classification, as described above.

As further shown in FIG. 7, process 700 may include assigning the second page of the document a second label corresponding to the second classification (block 750). For example, the document classifying platform (e.g., using computing resource 335, processor 420, memory 430, storage component 440, and/or the like) may assign the second page of the document a second label corresponding to the second classification, as described above.

As further shown in FIG. 7, process 700 may include storing the first label for access by a third-party device (block 755). For example, the document classifying platform (e.g., using computing resource 335, processor 420, memory 430, storage component 440, communication interface 470, and/or the like) may store the first label for access by a third-party device, as described above.

As further shown in FIG. 7, process 700 may include storing the second label for access by a third-party device (block 760). For example, the document classifying platform (e.g., using computing resource 335, processor 420, memory 430, storage component 440, communication interface 470, and/or the like) may store the second label for access by a third-party device, as described above.

Process 700 may include additional implementations, such as any single implementation or any combination of implementations described below and/or in connection with one or more other processes described elsewhere herein.

In some implementations, the document classifying platform may obtain text data associated with the first page of the document when the first confidence score fails to satisfy the first threshold value, and may determine for the first page of the document, using a second machine learning model, a third classification of one of the plurality of document types and a third confidence score associated with the third classification based on the text data, where the third confidence score indicates a third confidence level that the first page of the document corresponds to the third classification. Additionally, the document classifying platform may compare the third confidence score and a third threshold value, and may accept the third classification of the document when the third confidence score satisfies the third threshold value.

In some implementations, the first image data may include a first image of the first page of the document, and the second image data may include a second image of the second page of the document. In some implementations, the plurality of document types may include a document containing personal identifying information, a document containing tax information, a document containing legal information, and/or a document containing banking information.

In some implementations, the document classifying platform may receive third image data associated with a third page of the document, and may determine for the third page of the document, and using the first machine learning model, a third classification of one of the plurality of document types and a third confidence score associated with the third classification based on the third image data, where the third confidence score indicates a third confidence level that the first page of the document corresponds to the third classification. Additionally, the document classifying platform may compare the third confidence score and a third threshold value, and may accept the third classification of the third page of the document when the third confidence score satisfies the third threshold value, where the one of the plurality of document types associated with the third classification is different than the one of the plurality of document types associated with the first classification and the one of the plurality of document types associated with the second classification.

In some implementations, the document classifying platform may assign the third page of the document a third label corresponding to the third classification, and may store the third label for access by a third-party device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a processor, for a document, and using a first machine learning model, a first classification of a document type, of a plurality of document types, and a first confidence score associated with the first classification,
   the first confidence score indicating a confidence level that the document type corresponds to the first classification;
   comparing, by the processor, the first confidence score and a first threshold value;
   selectively:
      accepting, by the processor, the first classification of the document type when the first confidence score satisfies the first threshold value; or
      obtaining, by the processor, information associated with the document when the first confidence score fails to satisfy the first threshold value;
   determining, by the processor, for the document, and using a second machine learning model, a second classification of the document type and a second confidence score associated with the second classification,
      the second confidence score indicating a confidence level that the document type corresponds to the second classification;

comparing, by the processor, the second confidence score and a second threshold value; and accepting, by the processor, the second classification of the document type when the second confidence score satisfies the second threshold value.

2. The method of claim 1, further comprising:
receiving a multiple-page document;
using a splitting technique to form multiple single-page documents from the multiple-page document; and
determining the document from the multiple single-page documents.

3. The method of claim 1, wherein the document contains at least two pages and the at least two pages contain different document types of the plurality of document types.

4. The method of claim 1, further comprising:
training the first machine learning model to determine the first confidence score based on historical data associated with a plurality of confidence scores of accurate document classifications, and
wherein the first confidence score is determined based on training the first machine learning model.

5. The method of claim 1, further comprising:
preprocessing the document by one or more of:
   an image contrast adjustment,
   an image noise filter,
   an image histogram modification,
   cropping an image of the document, or
   a skew correction operation; and
wherein the second classification is determined based on the preprocessing.

6. The method of claim 1, further comprising:
training the second machine learning model using information that identifier a plurality of textual features,
the textual features includes one or more of:
   words,
   phrases, or
   clauses; and
wherein the second classification is determined based on training the second machine learning model.

7. The method of claim 1, further comprising:
assigning a label after accepting the second classification of the document,
the label being one or more of:
   a file name,
   a tag,
   a flag,
   a location in directory system, or
   an entry in a log or database.

8. A device, comprising:
a memory; and
one or more processors to:
   determine, for a document, a first classification of a document type, of a plurality of document types, and a first confidence score associated with the first classification,
     the first confidence score indicating a confidence level that the document type corresponds to the first classification;
   compare the first confidence score and a first threshold value;
   determine for the document, a second classification of the document type and a second confidence score associated with the second classification when the first confidence score fails to satisfy the first threshold value, the second confidence score indicating a confidence level that the document type corresponds to the second classification;
   compare the second confidence score and a second threshold value; and
   accept the second classification of the document type when the second confidence score satisfies the second threshold value.

9. The device of claim 8, wherein the one or more processors are further to:
provide the document and information regarding the second classification to another device.

10. The device of claim 8, wherein the first classification is determined using one or more:
deep learning or
convolutional neural networks.

11. The device of claim 8, wherein the first confidence score is greater than the second confidence score.

12. The device of claim 8, wherein the first classification is one of:
a paystub,
a personal financial document, or
an income reporting form.

13. The device of claim 8, wherein the one or more processors are further to:
train a machine learning model to determine the first confidence score based on features of another document of a particular document type, and
wherein the first confidence score is determined based on the trained machine learning model.

14. The device of claim 8, wherein the one or more processors are further to:
train a machine learning model to use a computer vision technique to:
   identify a plurality of features of the document, and
   perform a dimensionality reduction to reduce the plurality of features to a particular feature set; and
wherein the first classification is determined based on the trained machine learning model.

15. A non-transitory computer-readable medium storing instructions, the instructions comprising:
one or more instructions that, when executed by one or more processors, cause the one or more processors to:
   determine, for a document, a first classification of a document type, of a plurality of document types, and a first confidence score,
     the first confidence score indicating a confidence level that the document corresponds to the first classification;
   compare the first confidence score and a first threshold value;
   selectively:
     accept the first classification of the document type when the first confidence score satisfies the first threshold value; or
     obtain information associated with the document when the first confidence score fails to satisfy the first threshold value;
   determine, for the document, a second classification of the document type and a second confidence score,
     the second confidence score indicating a confidence level that the document corresponds to the second classification;
   compare the second confidence score and a second threshold value; and accept the second classification of the document type when the second confidence score satisfies the second threshold value.

16. The non-transitory computer-readable medium of claim 15, wherein the first classification is determined using one or more:
   deep learning or
   convolutional neural networks.

17. The non-transitory computer-readable medium of claim 15, wherein the first confidence score is greater than the second confidence score.

18. The non-transitory computer-readable medium of claim 15, wherein the one or more instructions when executed by the one or more processors, further cause the one or more processors to:
   train a machine learning model to determine the first confidence score based on features of another document of a particular document type; and
   wherein the first confidence score is determined based on the trained machine learning model.

19. The non-transitory computer-readable medium of claim 15, wherein the one or more instructions when executed by the one or more processors, further cause the one or more processors to:
   train a machine learning model to use a computer vision technique to:
      identify a plurality of features of the document, and
      perform a dimensionality reduction to reduce the plurality of features to a particular feature set; and
   wherein the first classification is determined based on the trained machine learning model.

20. The non-transitory computer-readable medium of claim 15, wherein the one or more instructions when executed by the one or more processors, further cause the one or more processors to:
   receive a multiple-page document;
   use a splitting technique to form multiple single-page documents from the multiple-page document; and
   determine the document from the multiple single-page documents.

* * * * *